April 14, 1970     C. D. KELSAY     3,505,843
AIR GAGE MASTER AND METHOD FOR MAKING SAME
Filed May 26, 1967
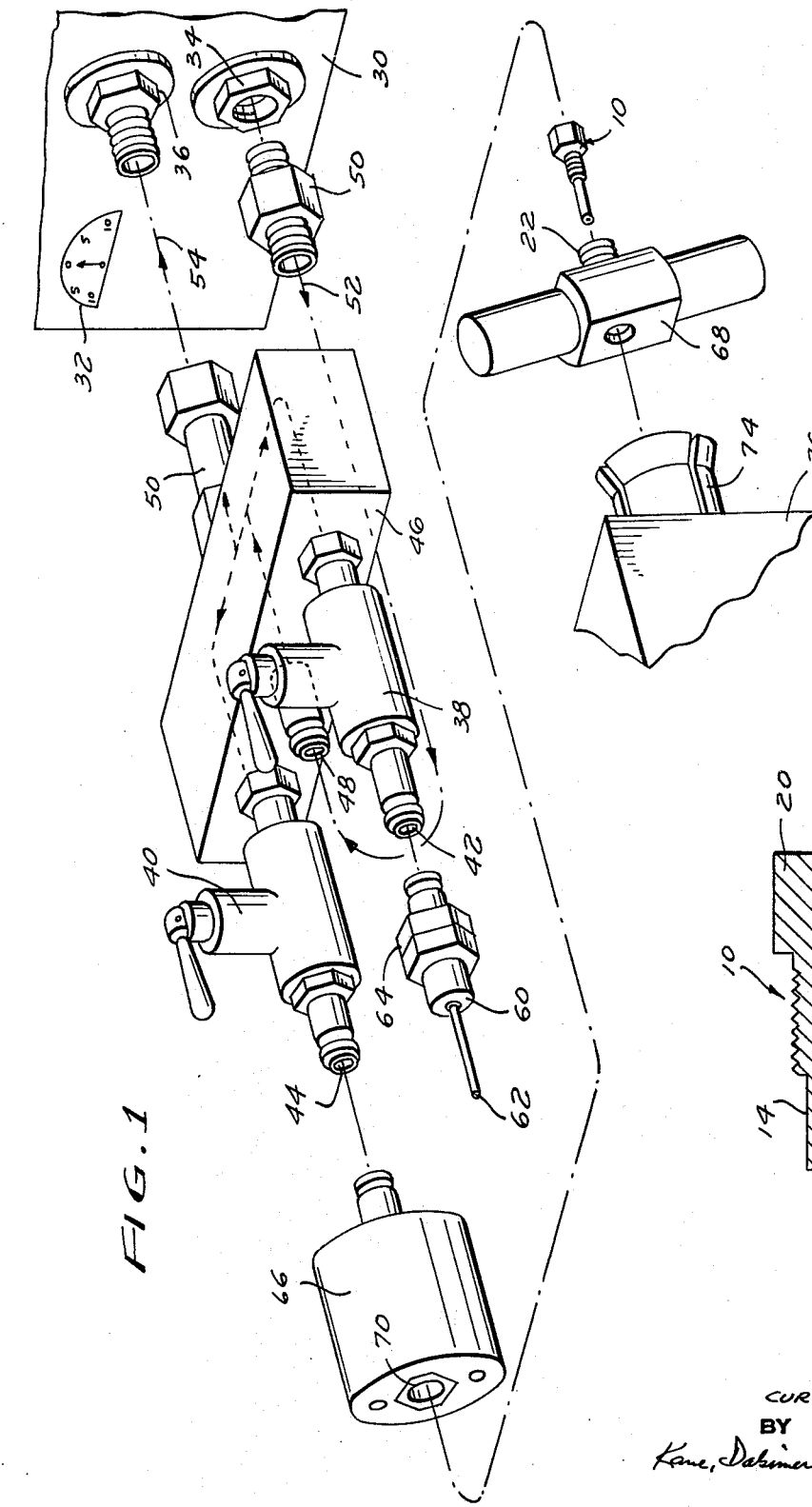
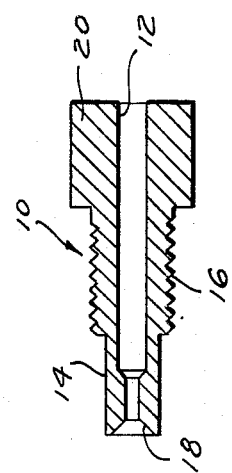
FIG. 2
INVENTOR
CURTIS D. KELSAY
BY
ATTORNEYS United States Patent Office 3,505,843
Patented Apr. 14, 1970

3,505,843
AIR GAGE MASTER AND METHOD
FOR MAKING SAME
Curtis D. Kelsay, Columbus, Nebr., assignor to Becton, Dickinson and Company, East Rutherford, N.J., a corporation of New Jersey
Filed May 26, 1967, Ser. No. 641,839
Int. Cl. B21c 51/00
U.S. Cl. 72—34
5 Claims

ABSTRACT OF THE DISCLOSURE

A gaging apparatus for producing a working master having flow and pressure characteristics which are identical to those of a standard sample hypodermic needle from which the master is produced. A master having an inner diameter slightly larger than standard is placed in a collet which may be squeezed so as to reduce the master cross-sectional flow area. Two valves alternately supply the master and the standard with a constant flow of compressed air. Gage back pressure, due to flow through the standard, is monitored upstream of the standard and this pressure serves as a reference. The master cross-sectional flow area is reduced until upstream gage pressure of the master is identical to the standard.

BACKGROUND OF THE INVENTION

This invention relates to so-called "working masters" for use in assuring quality control of hypodermic needles and similar products.

It is important that the pressure and flow characteristics of all hypodermic needles for a particular model of a certain length and diameter be identical, or nearly identical, within acceptable limits. Further, it is important that a minimum flow path exists.

For each model needle, a standard for the particular gage and length is made and preserved under prescribed conditions to maintain constant characteristics. Since it is not practical to use the standard itself in controlling production, due to possible alteration in characteristics through continuous use and testing, masters of some form have been produced. Masters used in the past have had lifetimes of one or two days of production testing.

Several methods to produce a master have been considered. Representative of these is the use of precision sapphires, stainless steel or carbide having a hole which is slightly smaller than the internal diameter of the standard and which hole is lapped until the master produces the identical back pressure characteristics of the standard sample.

However, in view of the numerous gages and lengths required, it may be necessary to produce over a thousand working masters, and the lapping of valuable stones and materials results in a very expensive and time consuming operation.

SUMMARY OF THE INVENTION

In view of the foregoing and in a broad sense the present invention provides an apparatus for the production of working masters.

The apparatus for carrying out the invention includes a gage adapted to receive and pass to the system, under either constant air flow or pressure conditions, compressed air. The constant output is alternately, by means of a pair of valves, passed through one of two branches of the system and through a standard sample and a working master, respectively. Back pressure developed by the standard is read on the gage upstream of the standard and this pressure is used to define a reference. Means are provided in the other branch for changing the flow characteristics of the master so that these characteristics may be adjusted thereby to produce a back pressure read on the gage upstream of the master which is identical to the reference pressure.

In view of the foregoing the invention uniquely overcomes the problems and disadvantages brought out above and has for its principal object, the provision of a device and method for the relatively inexpensive and simple production of working masters which have limited or no drift from initial calibration characteristics thereby to be used to set up a machine for a specific gage and needle length.

Other objects and advantages of the present invention will readily come to mind during the course of the following discussion taken in conjunction with the drawing illustrating the invention.

BRIEF DESCRIPTION OF THE DRAWINGS

The accompanying drawing illustrates a preferred embodiment of the invention. By this drawing:

FIGURE 1 shows schematically the apparatus for producing a working master; and

FIGURE 2 is a cross-sectional view of a master made in accordance with the invention.

DESCRIPTION OF THE PREFERRED EMBODIMENT

FIG. 1 shows, in exploded form, a general schematic layout of the apparatus by which a working master, in accordance with the present invention, is formed.

The master, best shown in FIG. 2, is denoted by the numeral 10. The master is generally elongated in construction and provided with a central longitudinal bore 12 which is relatively larger in internal diameter than a standard needle sample thereby displaying different characteristics when subjected to a constant flow of air or constant air pressure. As the description develops, it will be apparent that this master will be operated upon to reduce the "effective area" of bore 12 so that the master and standard sample, for the foregoing constant conditions, will be characteristically identical while not physically identical.

FIG. 2 shows only a single master but it is to be understood that a multiplicity of masters may be made and are generally made, each displaying suitable required characteristics dependent upon gage and cannula length of a sample. This multiplicity of masters is needed to set up an air gaging machine for quality control purposes.

Master 10 is provided with a tubular portion 14 which terminates at one end in a threaded area 16 and is countersunk at the other to provide a bevelled entrance 18 to the bore 12. The bevelling is appropriate, since, during machining, all burrs will be removed and by eliminating sharp corners the sensitivity with respect to the coefficient of air discharge is reduced. It is desirable to remove burrs prior to calibration since the master may be calibrated with a burr in place yet after calibration the same burr is lost causing an undesired change in flow characteristics.

The master 10 is also formed with a bolt-head 20, which together with the master threaded portion allows the unit to be received in a suitable holder whereby the master may be calibrated.

The apparatus of FIG. 1 is generally of the pneumatic variety which includes a gage 30 responsive to and located in the line to indicate upstream pressure or flow change on a deflection meter 32.

The gage 30 may be any one of several commercially obtainable gages manufactured by, for example, Sheffield or Federal Products Corporation.

The gage 30 is provided with an outlet 34 through which compressed air from a source (not shown) emerges and an inlet 36 connected to meter 32 for indicating, by needle deflection, upstream flow or pressure characteristics.

As may be conventional, the air supplied from the source is metered by a rotometer or similar structure (not shown), as choice dictates. This may be separate structure or incorporated in the gage and functions so as to adjust the air input so that the system is subjected to constant conditions, either constant air flow or air pressure.

The pneumatic system includes the gage 30, a pair of valves 38 and 40 having outlets 42 and 44 leading to the atmosphere, and connecting structure to connect each valve outlet to the compressed air emanating from gage outlet 34. In FIG. 1 the connecting structure is defined by block 46 having an inlet 48 and internal fluid passages, shown in dotted line, leading respectively to valves 38 and 40 and to an upstream outlet 50. The block is connected to gage 30 by flexible fluid conduits 52 and 54 mounted to the gage by fittings 56.

By the foregoing discussion it is apparent that by suitable adjustment of valves 38 and 40 the flow of compressed air may alternately be caused to exit outlet 42 and 44 together with an upstream back pressure being monitored due to flow through line 54. This feature forms part of the invention.

The remaining part of the invention is considered to be best described by the presentation of a discussion of the operation. Thus, in operation, a standard needle sample 60 having a length and bore 62 of precisely determined characteristics is mounted at the outlet 42 of valve 38. Mounting may be accomplished in any manner, as for example, by the provision of holder 64 which stationarily supports the standard. The holder may be directly received on the outlet or otherwise by means of an intermediate conduit, such as conduit 52.

Valve 38 is opened and valve 40 is closed so that an upstream back pressure developed by the standard sample may be measured on meter 32. The meter reading will be some function of the needle internal diameter and length and for a constant air pressure or flow into the system the reading may now be used as a reference. Appropriately the gage carries adjustments so that the reference is zero deflection.

Either prior to or after a test is run on the standard needle sample 60 and the reference determined the master 10 is included in the system. As is apparent the master is mounted at the outlet of valve 40 which, during a test on the sample, is closed so that the air flow is only through the latter.

Provided for supporting the master in the system are a pair of holders 66 and 68. Holder 66 is threaded or otherwise adapted to be connected to the outlet 44 of valve 40. A conduit, such as conduit 52, may, again, be used for this purpose. The holder 66 is provided with a central bore and downstream of the connection the bore is internally threaded at 70.

Holder 68 is provided with a complementary threaded extension 72 which is received within the bore at 70. Master 10 is received within the holders and stationarily supported in a conventional manner, such as by the interaction of threads 16 and complementary threads (not shown) within the bore of holder 68. By this mounting the tubular portion 14 will be remote from valve 40 and reside exteriorly of the holder 68.

The master tubular bore is then in a position to be received within a compressive gripping neck 74 of collet 76 (shown partially in FIG. 1). As is conventional the compressive forces exerted on the master bore may be increased or decreased by a rotary handle (not shown) on the collet.

Having determined the reference, as above, the valves 38 and 40 are closed and opened, respectively. Thus, the constant air flow or pressure is exerted on the master line and the upstream air pressure drop or air flow variation is monitored.

Since the bore 12 of master 10 has been selected to be slightly larger than the inner bore diameter 62 of standard needle 60, the air flow resistance through the valve 40 and master 10 will be less, with a constant input, than the flow resistance through the standard needle 60. Thus, gage meter 32 will indicate a deflection from the zero reference due to a change in air pressure or flow.

Upon a meter needle deflection, the neck 74 of collet 76 is caused to compressively squeeze upon the tubular portion 14 of master 10. Squeezing is continued, while monitoring the meter needle deflection, until the compression causes a reduction in the cross-sectional area of master bore 12 thereby to reduce the "effective area" of the bore and increase flow resistance. As the flow resistance is increased, gage needle deflection will move toward the zero reference.

When a zero reading is obtained, the pressure and flow characteristics of the master 10 and the standard needle sample 60 will be identical.

The master 10 is then ready for use in production. The master is used to set up an air gaging machine for quality control purposes. Production needles may then have their pressure and flow characteristics compared to the master.

In the previous discussion little has been said about the particular operating characteristics of various components, such as the collet, and valves. This operation is considered to be well-known in the art. What should be pointed out, however, is that the valves are identical so as to display the same flow characteristics for a constant input. Further, the standard needle sample and master are supported to the respective valve outlets by a substantially similar mounting so that the bore entrances will be similarly disposed. In other words, all factors are to be constant so that the flow characteristics of a worked-upon master will be identical to reference determined by the standard.

It is apparent from the above description that masters may be made having the desired pressure and flow characteristics for a large number of needle sizes, and that this may be done simply and inexpensively.

The master 10 should be compared and tested against the standard needle 60 from time to time, to prevent straying of flow characteristics beyond allowable tolerances and collet 76 may be applied, when necessary, so as to correct for enlargement of the bore 12 of the master 10 through continuous use in the quality control of production needles.

From the foregoing description, the objects and advantages of the invention are apparent. It should be understood, however, that the foregoing discussion is directed to a preferred embodiment, and is by way of example, not limitation. Clearly, modifications will be apparent to those skilled in the art which will fall within the limits of the invention, the scope of which is defined by the appended claims.

Having described the invention, I claim:

1. An apparatus for making a working master having a hollow tubular portion with desired flow characteristics for quality control of hypodermic needles comprising a fluid system having a pair of fluid outputs and an input adapted to be connected to a constant source of compressed air, an air gage, said gage being provided in said system between said inlet and outlets, means supporting a standard hypodermic needle at one of said outputs and a working master having a hollow tubular portion at the other of said outputs, means alternately applying identical values of compressed air to said standard needle and working master thereby to individually read by gage needle deflection the flow resistance of said needle and master, and means including an adjustable collet mounted at the other of said outputs in surrounding relation to said hollow tubular portion so that collar compressive adjustment varies the cross-sectional area of said hollow tubular portion until the master flow resistance is identical to the needle flow resistance.

2. The apparatus of claim 1 comprising a valve in each fluid output which may be opened and closed thereby to read alternately the flow resistance of said working master and standard needle.

3. The apparatus of claim 1 comprising adjusting means on said gauge for returning the gauge needle deflection caused by standard needle flow resistance to zero thereby to become a reference.

4. The method for producing working masters having a hollow tubular portion so that they display desired pressure and flow characteristics for quality control of hypodermic needles comprising the steps of introducing a known quantity of compressed air into the bore of a standard sample hypodermic needle, then introducing the same quantity of compressed air into a working master having a hollow tubular portion whose bore diameter is slightly larger than the diameter of said standard sample hypodermic needle bore, comparing the back flow pressure resistance of said master and standard, and reducing the cross-sectional area of said master tubular portion without changing the cross-sectional configuration until such pressure resistances are identical.

5. The method of claim 4 comprising the steps of passing said quantity of compressed air through a gauging device, calibrating said gauging device so that the standard needle back pressure resistance reading is a reference thereby to allow said comparison.

References Cited
UNITED STATES PATENTS 2,075,921  4/1937  Winkler et al. _____ 72—34
2,225,513  12/1940  Summers _____ 29—407 X CHARLIE T. MOON, Primary Examiner D. C. REILEY, Assistant Examiner U.S. Cl. X.R.

29—407; 73—37.9